United States Patent
Boiero et al.

(10) Patent No.: US 8,629,802 B2
(45) Date of Patent: *Jan. 14, 2014

(54) METHOD FOR THE LOCATION OF MOBILE TERMINALS

(75) Inventors: Luca Boiero, Turin (IT); Davide Cavallo, Turin (IT)

(73) Assignee: Telecom Italia S.p.A., Milan (IT)

( * ) Notice: Subject to any disclaimer, the term of this patent is extended or adjusted under 35 U.S.C. 154(b) by 0 days.

This patent is subject to a terminal disclaimer.

(21) Appl. No.: 13/022,083

(22) Filed: Feb. 7, 2011

(65) Prior Publication Data

US 2011/0128184 A1 Jun. 2, 2011

Related U.S. Application Data

(63) Continuation of application No. 10/560,893, filed as application No. PCT/EP03/06382 on Jun. 17, 2003, now Pat. No. 7,884,760.

(51) Int. Cl.
  *G01S 19/46* (2010.01)
(52) U.S. Cl.
  USPC .................................................. 342/357.29
(58) Field of Classification Search
  USPC .......................................... 342/357.2–357.78
  See application file for complete search history.

(56) References Cited

U.S. PATENT DOCUMENTS

| 6,061,018 | A * | 5/2000 | Sheynblat ................ 342/357.33 |
| 6,289,280 | B1 | 9/2001 | Fernandez-Corbaton et al. |
| 6,552,681 | B1 | 4/2003 | Hayward et al. |
| 6,756,938 | B2 * | 6/2004 | Zhao et al. ................ 342/357.33 |
| 7,359,712 | B2 * | 4/2008 | Gutowski et al. .......... 455/456.1 |
| 2001/0046869 | A1 * | 11/2001 | Cedervall et al. ............. 455/456 |
| 2003/0003923 | A1 | 1/2003 | Tsunehara et al. |
| 2003/0085838 | A1 | 5/2003 | Zhao |
| 2003/0125046 | A1 | 7/2003 | Riley et al. |
| 2003/0224802 | A1 | 12/2003 | Nir et al. |
| 2005/0272447 | A1 | 12/2005 | Eckel |

FOREIGN PATENT DOCUMENTS

WO WO 01/86315 A2 11/2001

OTHER PUBLICATIONS

E.D. Kaplan ed. "Understanding GPS: Principles and Applications", Artech House Publications, pp. 3-5, (1996).

* cited by examiner

*Primary Examiner* — Cassie Galt
(74) *Attorney, Agent, or Firm* — Finnegan, Henderson, Farabow, Garrett & Dunner, L.L.P.

(57) ABSTRACT

A location of a mobile terminal in a given area may be determined by including the mobile terminal in a satellite-based positioning system and in a cellular communications system. The approximate coordinates of the mobile terminal may be determined based on both satellite signals received from the satellite-based system and information related to the cellular communication system, where the coordinates include an altitude coordinate. An estimate of the altitude coordinate may be derived from the information related to the cellular communication system. The approximate coordinates may be determined using the estimate of the altitude coordinate and information provided by the satellite-based system by providing an approximate bi-dimensional positioning of the terminal and exploiting the bi-dimensional positioning and the estimate of the altitude coordinate.

22 Claims, 3 Drawing Sheets

Figure 5:
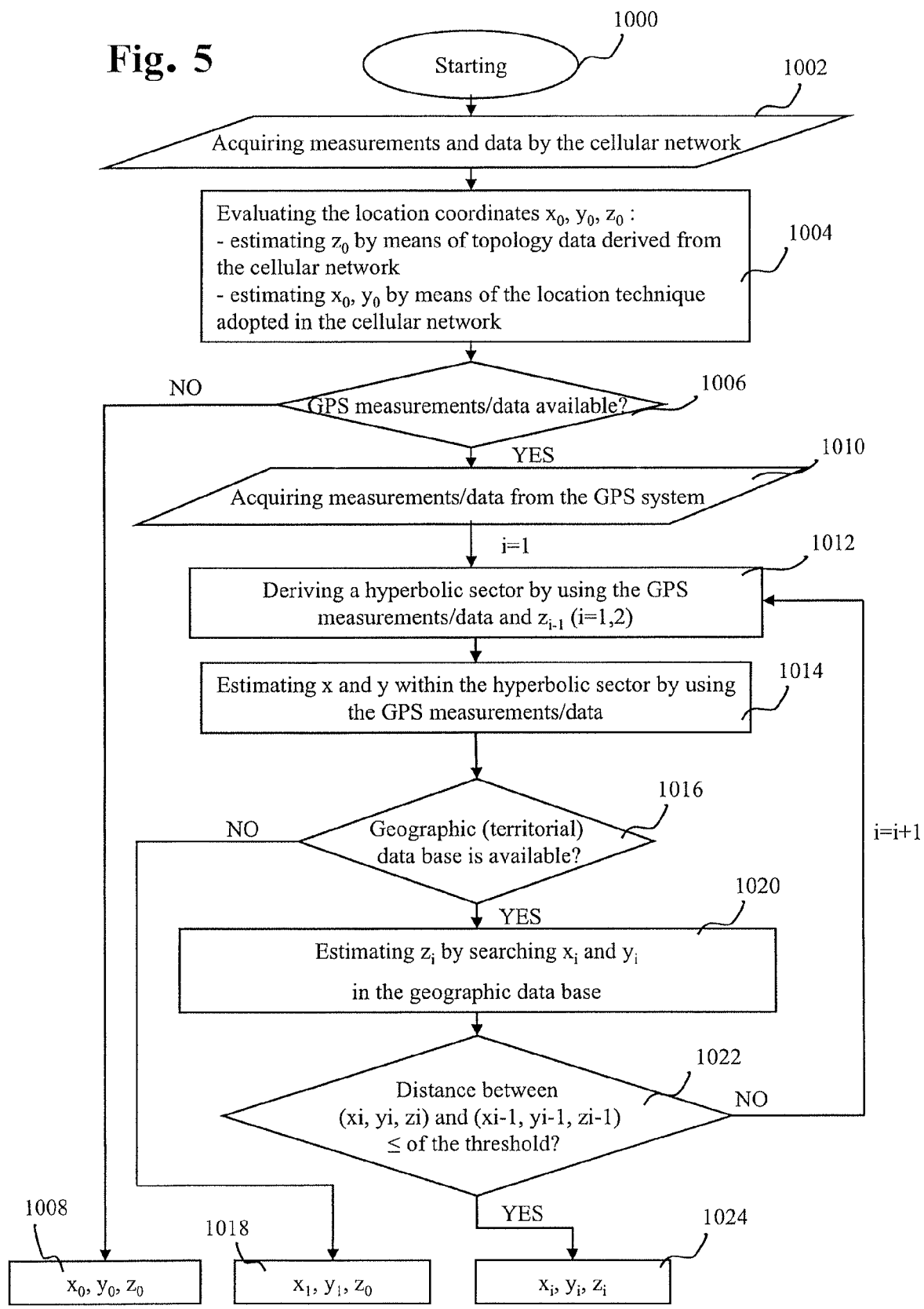

Fig_1
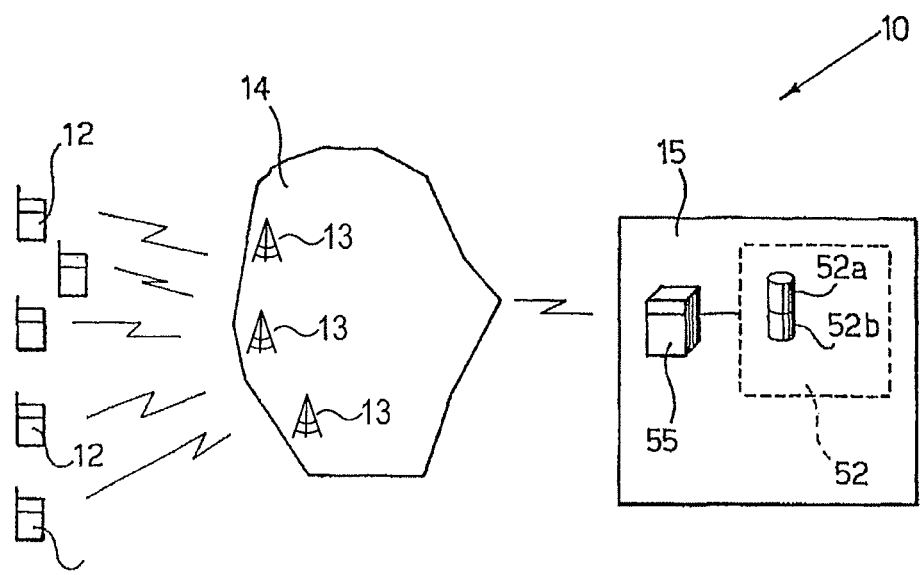
Fig_2
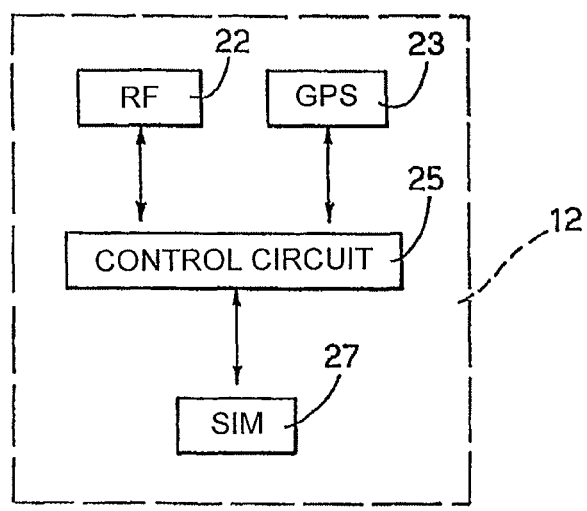

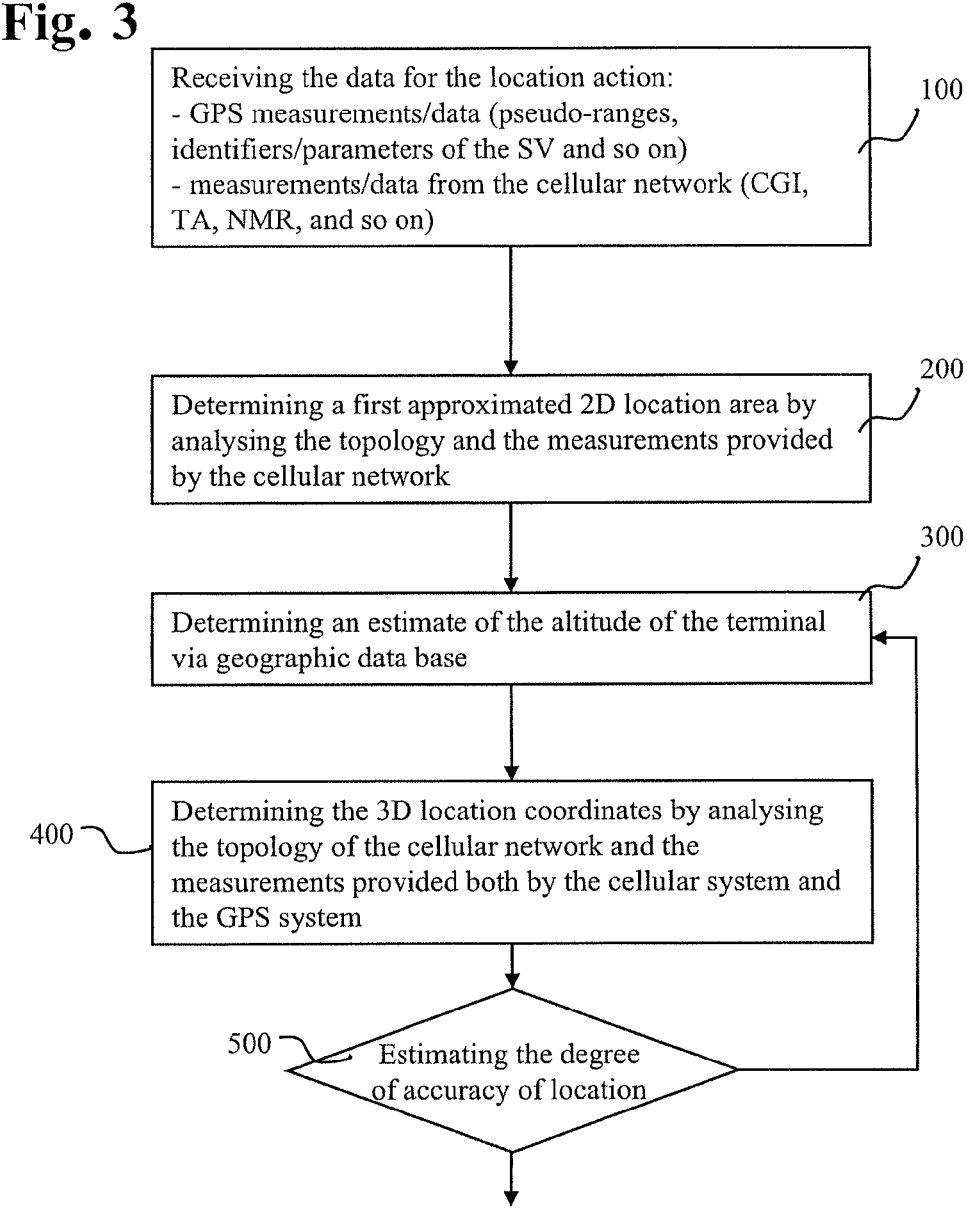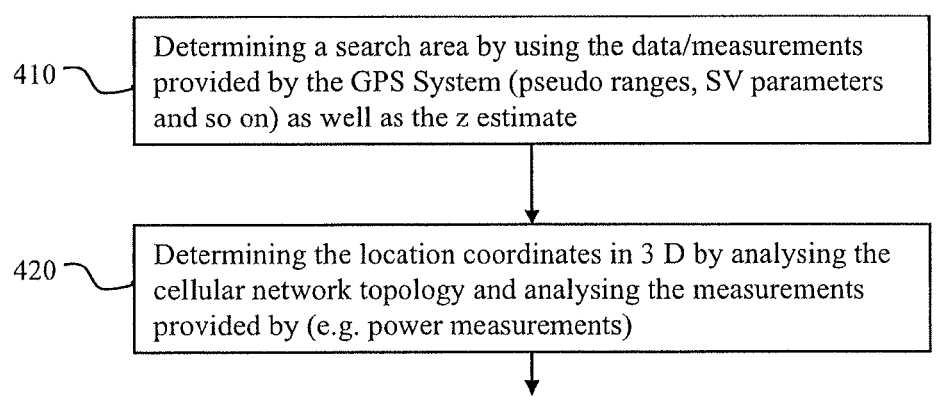

METHOD FOR THE LOCATION OF MOBILE TERMINALS

CROSS REFERENCE TO RELATED APPLICATION

This application is a continuation of U.S. application Ser. No. 10/560,893, filed on Dec. 16, 2005 now U.S. Pat. No. 7,884,760, which is a national phase application based on PCT/EP2003/006382, filed Jun. 17, 2003, the disclosures of both of which are incorporated herein by reference.

FIELD OF THE INVENTION

The present invention relates to techniques for the location of mobile units or terminals.

DESCRIPTION OF THE RELATED ART

A number of techniques are known in the art that permit the location of mobile units in a given area. The satellite-based positioning system known as the Global Positioning System (GPS) is exemplary of such systems.

By detecting and measuring signals transmitted simultaneously by at least four satellites in view, and from knowledge of the position of each satellite at the time of transmission, the GPS system makes it possible to locate a mobile receiver on or near the earth surface by triangulation. Similarly, by measuring the Doppler effect on the received signals, the relative speed of the mobile unit with respect to each satellite can also be determined. This is possible because the signals transmitted from the satellites convey almanac/ephemeris data that provide information about the satellite positions and speeds at all times.

For a general description of the GPS system and its applications, reference can be made to: "*Understanding GPS: Principles and Applications*" Elliott D. Kaplan, ed., Artech House Publications, 1996.

A disadvantage of satellite-based systems such as GPS (and other similar systems such as those known as GLONASS or GALILEO) lies in that those systems almost inevitably fail to provide an adequate location of the mobile terminal in those situations where insufficient information is received from the satellites e.g. because less than four satellites of the GPS system are "visible" by the mobile terminal.

Within this context, visibility is generally intended to mean the possibility for a given satellite to provide signals of sufficient strength for detection by the mobile terminal. Lack of visibility of one or more satellites of the GPS system is a frequent occurrence in urban areas and, in any case, in those areas having morphological features likely to produce shadow areas or cause reflection of signals.

For providing acceptable location data also in those situations where only three, two or even just one satellite is visible, certain arrangements have been devised where the time behaviour of one or more unknown entities is to be estimated. These solutions are based on the expectation that, for instance in an urban environment, the z coordinate (altitude) may change only slowly and/or the speed and the direction of movement may remain constant over a given time interval, while also the receiver clock drift can be estimated. These assumptions/predictions are however valid only over a short lapse of time (in certain cases just few seconds).

Alternative location techniques have also been devised where e.g. the GPS positioning data are interpolated by way of integration with data provided by inertial systems and/or digital maps or the nature of certain communication systems is exploited for locating mobile units.

For instance, in a cellular communications system, in order to operate correctly a mobile terminal must by way of necessity be "covered" by a cell. Consequently, the location of the mobile terminal can be at least approximately determined by identifying the cell or the cells that cover that terminal at a given instant of time. The degree of accuracy of the location action may be improved by more precisely identifying the position of the mobile user within a given cell.

In WO-A-01/86315 a location system is disclosed wherein data provided by a cellular communication network (for instance GSM) and a satellite-based location systems (such as GPS) are exploited jointly in connection with data derived from a so-called geographic information system (GIS). This is a computer system capable of assembling, storing, manipulating, and displaying and otherwise providing geographically referenced information, i.e. data of various types, identified according to the locations thereof.

Essentially, such a prior system provides for approximated location data being generated by using information from the satellite-based system (typically, a situation is contemplated where signals from less than four satellites are available) and/or the data/measurement obtained from the cellular network. The location estimation is then refined by comparing the actual GPS signals available with corresponding signals simulated by using the data from the geographic information system (GIS).

Such a prior art system has intrinsic limitations due to the complexity of the processing steps required for upgrading the predictions for the signals from the satellites by taking into account factors such as intensity, multipath components and so on.

The prior art in question fails to take into account the fact that in all those situations where less than four satellites in the GPS system are visible an estimation of the z coordinate (altitude) is required in order to be in a position to exploit the remaining information available (provided by two or three satellites) and the degree of accuracy in the location is in fact proportional to the precision in determining the z coordinate.

Additionally, the solution disclosed in WO-A-01/86315 provides for two location areas, obtained on the basis of data/measurement derived from the cellular system and the satellite system, respectively, to be intersected: due to the degrees of approximation related to their definition, the two areas in question may in fact have no intersection at all.

OBJECTS AND SUMMARY OF THE INVENTION

The need therefore exists for alternative arrangements adapted to exploit in a simple and more effective way the data/measurements available in a hybrid satellite/cellular network location system. Specifically, the need is felt for arrangements that may advantageously exploit the specific features of the data/measurements available, especially by referring to those situations where the satellite-based system is adversely affected by the lack of visibility of one or more satellites.

The object of the present invention is to satisfy these needs.

According to the present invention, such an object is achieved by means of a method having the features set forth in the claims that follows. The invention also relates to a corresponding arrangement and a mobile terminal for use therein, as well as computer program products directly loadable in the memory of least one computer and including software code portion for performing the method of invention and/or the mobile terminal of the invention when the product is run on a computer.

In brief, the arrangement described herein is a hybrid location arrangement based on the integration of a satellite-based system and a cellular communication network particularly adapted for use in those circumstances when only three or two satellites in the satellite system are visible.

An embodiment of the arrangement disclosed herein involves a first estimate of the z coordinate being defined as a value taken from a geographic data base and related to an estimate of the two other coordinates (x, y). This estimate is defined on the basis of the network topology and an analysis of the so-called LCS (i.e. Location Services) measurements currently available in a cellular communications system such as a GSM system.

If such a geographic data base is not available, the estimate of the altitude coordinate can be defined as e.g.:
  the corresponding z coordinate of the nearest base station,
  the minimum value of the z coordinates of a given set of adjacent base stations, or
  an average value of the z coordinates of these adjacent base stations, such an average value being possibly weighted by means of power measurements.

As a second step, the estimate of the z coordinate defined in the foregoing is used in connection with the analysis of the (time/range) measurements available from the satellite system. This leads to defining an approximated location area (for instance an hyperbole in the case of two satellites or an approximated location estimate in the case of three satellites).

As a further step, the approximated location area defined in the foregoing in connection with the measurements permits, by means of repeated analysis of the network topology and measurements, the location estimate x, y to be further refined.

Finally, a new position estimate leads to an iterative process which permits the estimate of the z coordinate to be further refined by means of a geographic data base.

The arrangement described herein is based on the recognition that, when less than four satellites are visible in a satellite-based system such as GPS, an approximated location area can be found only by providing an estimate of the z coordinate. Typically, the last data available for z (on the basis of the latest location available) are used.

The basic idea underlying such an embodiment is to use a bi-dimensional cellular localization in order to have approximated x, y coordinates available. These approximated x, y coordinates are then used to extract from a geographic data base the corresponding value for the z coordinate.

As indicated, if such a geographic data base is not available, the z coordinate can be estimated by referring to the altitude of the nearest base station, the minimum altitude along adjacent base station or the average altitude value of the adjacent base stations, possibly weighted on the basic of power measurement.

The arrangement described herein does not rely on the intersection of two search areas defined on the basic of data obtained via the satellite system and via the cellular system, respectively. Conversely it primarily exploits the approximated area obtained by means of data/measurements provided by the satellite system, as these are intrinsically more accurate.

Preferably an arrangement is adopted that exploits data/measurements (for instance power measurements) provided by the cellular system for determining the position within an approximate search area. This may be achieved, for instance, by comparing field intensity values predicted by means of a propagation model with corresponding field intensity values as measured at the mobile terminal.

The search area is limited by using the measurements provided by satellite system (and optionally, some data provided by the cellular system). A point within that area is then determined by adopting the same principles described in the foregoing. Finally, the accuracy of the location is determined by jointly exploiting data provided both by the satellite system and the cellular system.

Using a geographic data base refines the information concerning the z coordinate. The bi-dimensional (x, y) coordinates determined during each step are used for a new estimation of z that can be used for refining a search area of the satellite system and thus positioning. Iteration is repeated over a number of steps.

In the case that signals from only two satellites are available, a set of points in the form of an hyperboloid is defined by using the difference of the two first pseudo-range measurements available and the degree of inaccuracy is determined by means of geometric and propagation analysis: more precisely, not just a hyperbole, but a set of hyperboles with a given width is considered. A basic requirement is that the set must include with a high probability the true position of the terminal to be located. The set is then used to limit the search area wherein the position of the mobile unit is to be located. Such a point can be searched within the search areas by resorting to the same methods already mentioned in the foregoing.

Finally, in the case that only one satellite at a time is available, the solution may be resorted to of exploiting two subsequent measurements from one satellite or two non-simultaneous measurements from two satellites. The two measurements thus obtained are used to define a hyperbole as in the case of two satellites.

BRIEF DESCRIPTION OF THE ANNEXED DRAWINGS

The invention will now be described, by way of example only, by referring to the enclosed figures of drawing, wherein:

FIG. 1 is a block diagram showing the general architecture of the system according to the invention, FIG. 2 is a functional block diagram of a corresponding mobile terminal, and FIGS. 3 to 5 are flow charts exemplifying operation of the arrangement disclosed herein.

DETAILED DESCRIPTION OF PREFERRED EMBODIMENTS OF THE INVENTION

The description provided in the following refers to an embodiment wherein a satellite-based locations system such as GPS is integrated with a terrestrial cellular mobile communications system such as a GSM (General System for Mobile) system.

However, the possible field of application of the invention is in no way limited to those two specific systems mentioned. The scope of the invention does in fact embrace the possible integration of any satellite-based location system with any cellular terrestrial communication system for the purpose of locating mobile terminals.

By referring to FIG. 1, a location system 10 includes a plurality of mobile terminals 12, such as cellular phones, each such mobile terminal being also configured as a receiver/processor unit of a GPS positioning system. Such mobile phones are available commercially as witnessed e.g. by the mobile phone currently available under the trade name Benefon Esc.

It will be generally assumed that the terminals 12 are distributed in a random manner over a given area defining the area over which the location action is to be performed.

The terminals 12 are included in a cellular communications network 14 such as a GSM network to which a mobile location center (MLC Center) 15 is associated.

As shown in FIG. 2 the operating features of a cellular phone and a GPS receiver are integrated in each terminal 12 by providing a radio frequency circuit 22, a GPS receiver/processor 23, and a control circuit 25 connected to both the RF circuit 22 and the GPS receiver 23.

The control circuit 25 is adapted to control operation of the terminal 12 on the basis of software modules included in the control circuit 25 and a SIM card 27 connected (in a known manner) to the control circuit 25.

The SIM (Subscriber Identity Module) card 27 is adapted to support the user profile, that is information concerning the user's identifier number (IMSI or International Mobile Subscriber Identity), the services contracted with the provider and other utilities.

The control circuit 25 is configured, in a known manner, to periodically perform, via the RF circuit 22, electronic field measurements (RF measurements) within a determined number of frequency channels and select among those channels a maximum number of RF measurements (for instance up to seven in the case of a GSM terminal) corresponding to channels where the mobile terminal 12 is in a position to decode a respective identifier code.

A function is provided in the control circuit 25 such that, as a result of command signals adapted to be activated by the user of the terminal, both RF—and GPS—measurements are performed and the results transmitted to the location center 15, for instance in the form of short messages (SMS).

The network 14 generally includes a plurality of base stations (not shown in the drawing, but of known type) adapted to permit transfer of messages and communications from the terminals 12, located at elementary points (or pixels) in the area wherein location is performed, to service centers, systems and apparatus connected to the network 14 as is the case of the center 15.

The center 15 includes a processor unit such as a computer 55 of a known type. Experiments carried out by the applicants show that, for the purpose of the invention, a Pentium® III processor with a double CPU with a RAM in an internal memory of 512 MBytes and Windows® NT satisfactorily meets the processing requirements of the present invention. Associated with the computer 55 is a disk subsystem 52, of a known type, including a first storage area 52a for storing data base items comprising a reference data base as well as a second storage area 52b for storing programs to be used for identifying the location of the terminals 12.

As better described in the following, the center 15 is adapted to process the programs stored the area 52b in order to identify on the basis of the SMS messages received from the terminals 12 and the data base items of the reference data base stored in the area 52a, the positions of the terminals 12.

The corresponding position information thus generated is adapted to be transmitted to service centers and/or to the terminals 12 by means of the network 14.

In a possible alternative arrangement, at least part of the programs to be used in identifying the location of the terminals may reside in the SMS card 27 rather than in the control circuit 25.

In a preferred embodiment, the data base items memorized in the area 52a include the following:

- a geographic data base of the area(s) wherein the terminals 12 are to located including data on buildings with a resolution of, say, 10 m,
- configuration data of the cellular network (such as e.g. location of the base stations, parameters of the radiation diagrams, and so on),
- an optional data base including data on the orbits of the satellites in the GPS system as well as all other data required for correct operation of the location functions.

All the data considered in the foregoing are continuously updated. The modules carrying out the location function proper are thus in a position to operate correctly on the latest available data.

The flowchart of FIG. 3 describes the logical process followed in the location action. This can be regarded as essentially comprised of four basic phases designated 100, 200, 300 and 400, respectively.

The first phase 100 includes all the steps where the mobile terminal receives the data for the location action.

This includes GPS measurements/data (pseudo-ranges, identifiers/parameters of the "space vehicle" or SV and so on) as well as measurements/data from the cellular network including parameters such as the cell global identity (CGI), the timing advance (TA), the network measurement report (NMR), observed time difference (OTD) and so on.

The meaning and significance of each and every parameter previously mentioned is well known to those of skill in the art and does not require a detailed description herein.

The second phase 200 leads to determining a first approximated bi-dimensional location area. This result is achieved by analysing the topology and the measurements provided by the cellular network.

In the subsequent phase 300, an estimate is derived of the altitude (z coordinate) of the terminal.

This is obtained via the network 14 starting from the geographic data base stored at 52a with the location center 15.

In the absence of such data base, various methods can be resorted to in order to generate a first estimate for z, e.g.:
  the z coordinate is set equal to the altitude with respect to the sea level of the site of base station (BTS) that is currently serving the mobile terminal seeking location,
  the z coordinate is set equal to the minimum value of the altitudes with respect to the sea level of the base stations nearest to the mobile terminal (e.g. the serving base station and the base stations adjacent thereto), or
  the z coordinate is set equal to an average value of the altitudes with respect to the sea level of the base stations nearest to the mobile terminal.

Possibly, the average value may be computed as a weighted average, where weighting is a function of the power received by the terminal from the nearest base stations, with the more remote stations providing a smaller contribution to the average value.

In the phase 400 the three-dimensional location coordinates (x, y, z) of the mobile terminal 12 are determined by analysing the topology of the cellular network and the measurements provided both by the cellular system and the GPS system.

In a subsequent phase designated 500 the degree of accuracy of location previously determined is estimated.

If accuracy is found to be already satisfactory (which can be achieved, e.g. by means of a threshold related to the degree of convergence of the iteration process), the coordinates determined are taken as those giving the estimated position of the terminal.

In the negative, and if a topologic data base is available, the degree of accuracy of the positioning action is refined by resorting to an iterative process.

Essentially such a process may involve at each step extracting from the geographic data base 52a a new estimate of the z coordinate corresponding to the latest computed value for the other coordinates, namely x and y.

FIG. 4 details the two basic sub-phases, designated 410 and 420, respectively, comprising the phase 400.

During the first sub-phase 410, a search area is determined by using the data/measurements provided by the GPS System (pseudo ranges, SV parameters and so on) as well as the z estimate.

Subsequently, in the sub-phase 420, the location coordinates in three dimensions are determined by analysing the cellular network topology and analysing the measurements provided by e.g. power measurements.

The arrangement disclosed herein essentially implements a data fusion technique adapted to provide improved results in terms of accuracy and availability in comparison with conventional satellite-based, and terrestrial location techniques previously used, without giving rise to an increased system complexity.

Interestingly, in comparison to other hybrid techniques (such as the technique currently referred to as GPS plus Enhanced CellID Information), the arrangement disclosed herein does not provide for intersecting the final positioning estimates over separate planes obtained by the two methods.

Conversely, the solution disclosed herein is based on the joint and co-ordinate exploitation of the rough measurements obtained in different phases via the GPS system and the GSM system.

The solution disclosed herein is particularly adapted for those operating scenarios characterized by a reduced availability of the GPS system (for instance urban areas, indoor applications, and the like) that is operating scenarios where the number of the satellite signals that can be reliably detected and measured is less than four (typically 1, 2 or 3 GPS measurements). The solution described herein is also adapted for use in those circumstances (that can be regarded as the very worst situation) where the user is at a fixed position and turns on his or her terminal in an area where the number of GPS signals would be per se insufficient for determining the point (for instance 1, 2 or 3 satellites in a visibility condition)

A noteworthy scenario of application of the arrangement disclosed herein is the case where only two satellites are visible.

In that case the search area obtained during the phase 410 would be a hyperbolic sector.

The complete GPS navigation system for calculating the user coordinates is comprised of four equations (one for each satellite i) of the type:

$$\rho_i = \sqrt{(x_{Si}-x_U)^2 + (y_{Si}-y_U)^2 + (z_{Si}-z_U)^2} + c \cdot \delta t_U$$

where:
- $\rho_i$ is the pseudo-range (PR) as measured by the receiver; this is primary affected by inaccuracies related to the propagation path: iono/tropospheric delays, fading, multipath and so on.
- $(x_{Si}, y_{Si}, z_{Si})$ are the coordinates of the i-th satellite, obtained by using the ephemeris parameters,
- $(x_u, Y_u, z_u)$ are the unknown coordinates of the user's terminal 12, and
- $\delta t_u$ is the unknown offset of the receiver clock with respect to the "GPS-time" scale (where c is the speed of light).

If only two equations relating to two satellites are available, the coordinate z ($z_u = z^*_u$) is set with one of the techniques considered in the foregoing during the step 300 and the problem related to the clock offset is dispensed with by performing the difference of the two pseudo-range measurements so that the common error due to the clock cancels out.

The following equation is thus obtained, which represents the intersection of the a hyperboloid, having its foci centered at the two satellites, with the plane $z_u = z^*_u$:

$$\rho_1 - \rho_2 = \sqrt{(x_{S1}-x_U)^2 + (y_{S1}-y_U)^2 + (z_{S1}-z^*_U)^2} - \sqrt{(x_{S2}-x_U)^2 + (y_{S2}-y_U)^2 + (z_{S2}-z^*_U)^2}$$

and then in the plane $(x_u, y_u, z_u = z^*_u)$ such equation represents a hyperbole.

By taking into account the various sources of inaccuracy, that are adapted to be a properly modelized, one passes from a hyperbole to a hyperbolic sector. Such a sector corresponds to the search area determined during the phase 410.

For determining the hyperbolic sector during the phase 410, contributions to inaccuracy introduced by the receiver are taken into account together with the contributions related to propagation and the geometrically effects and so on.

The flow chart of FIG. 5 details the various steps involved in the hybrid iterative location process outlined in the foregoing. This may apply e.g. to the case where two satellites in the satellite-based system (e.g. GPS) are visible.

Starting from a step 1000, in a step 1002 the measurements and the data made available by the cellular network are acquired. In a step 1004 a first set of values for the location coordinates $x_0, y_0, z_0$ is evaluated.

Specifically, this is done for the altitude coordinate $z_0$ by means of topology data derived from the cellular network. For the two other coordinates, i.e. $x_0, y_0$ the estimate is obtained by means of the location technique adopted in the cellular network, e.g. by power measurements. In principle, this may be any of the techniques considered in the foregoing.

In a step 1006 a check is then made as to the availability of GPS measurements/data adapted to be integrated with the measurements/data derived from the cellular network.

If no such measurements/data are available (negative outcome of step 1006), the initial estimate for the location coordinates $x_0, y_0, z_0$ as derived in the foregoing is taken as the result of location in a step 1008.

If the step 1006 yields a positive result, in a step 1010 the measurements/data derived from the GPS system are acquired and in a step 1012 a hyperbolic sector likely to include the point to be located is derived by using the GPS measurements/data and the latest value available for the altitude coordinate (i.e. $z_0$). By properly evaluating the incertitude contributions that affect the above-referenced equation a hyperbolic sector can be derived that includes with a high degree of probability the position of the terminal to be located.

In a subsequent step designated 1014 the longitude and latitude coordinates x and y are estimated again by processing the location (e.g. power) measurements of the cellular network. In this case, however the estimate (i.e. the bi-dimensional positioning x, y of the terminal 12) is carried out within the hyperbolic sector derived in the step 1012 by using the GPS measurements/data.

In a step 1016 a check is made as to the availability of geographic (territorial) data base items linking the altitude coordinate (i.e. z) to the other two coordinates (i.e. x and y) over the area where location is to be performed.

If no geographic information of this type is available (negative outcome of step 1016), then the two values for the longitude and latitude coordinates derived at step 1014 (i.e. $x_1$ and $y_1$) are taken together with the latest estimate available for the altitude coordinate (i.e. $z_0$) as the result of the location action. This occurs in a step designated 1008.

If the steps 1016 yield a positive result, in a step 1020 a new estimate for the z coordinate i.e. $z_1$ is obtained by searching the geographic data base and identifying $z_1$ as the value of the altitude coordinate corresponding to $x_1$ and $y_1$ (i.e. the two values for the longitude and latitude coordinates derived at step 1014).

In a step 1022 the distance is calculated between the latest location data calculated (i.e. $x_1$, $y_1$, $z_1$) and those previously available (i.e. $x_0$, $y_0$, $z_0$). The distance calculated is compared with a threshold indicative of the degree of accuracy pursued in the location action.

If the distance is lower than the threshold (positive outcome of step 1022), the latest location data calculated (i.e. $x_1$, $y_1$, $z_1$) are taken as the final result of the location action. This occurs in a step designated 1024.

A negative outcome of the step 1022 indicates the distance to be higher than the threshold, which in turns indicates the degree of accuracy of the location action being still not satisfactory.

In this latter case, the system evolves back to step 1012, thus starting an iterative process.

Such a process essentially involves exploiting the GPS measurements/data acquired in step 1010 for repeating step 1012 in order to determine a (new) hyperbolic sector by using the latest estimate available (generally designated $z_{i-1}$).

This new hyperbolic sector is then used in step 1014 to derive new values (generally designated $x_i$ and $y_i$) for the longitude and latitude coordinates.

These new values $x_i$ and $y_i$ are then used in the step 1020 to identify via the geographic data base a new value for z, namely $z_i$.

If the comparison of step 1022 shows that the distance of $x_i$, $y_i$, $z_i$ to $x_{i-1}$, $y_{i-1}$, $z_{i-1}$ (i.e. the previous estimate of the location coordinates) is less than the accuracy threshold, then the latest computed values $x_i$, $y_i$, $z_i$ are taken in step 1024 as the result of the location action.

If the comparison of step 1022 shows that the distance of $x_i$, $y_i$, $z_i$ to $x_{i-1}$, $y_{i-1}$, $z_{i-1}$ is still higher than the accuracy threshold, the system once more evolves back to step 1012 and a new step in the iterative location process is carried out.

Of course, the lower the accuracy threshold (i.e. the higher the degree of accuracy sought in the location action), the higher the likelihood that the steps 1012 to 1022 are repeated as an iterative process.

Consequently the accuracy threshold is judiciously set in order to achieve a sensible compromise between the accuracy sought and the processing load and times imposed on the system.

Of course, without prejudice to the underlying principle of the invention, the embodiments and the details may vary, also significantly, with respect to what has been described and shown, just by way of example, without departing from the scope of the invention as defined by the claims that follows. Specifically, it will be appreciated that the processing steps involved in the location process of the mobile terminal 12 may in fact be carried out in their entirety or almost in their entirety at the mobile terminal 12, provided this is equipped with the necessary processing capability and power. The processing tasks involved may however be at least partly transferred to the computer 55 of the location center 15. In that case, the network 14 may be used to ensure data transfer between the processing modules implemented at the mobile terminal 12 and at the mobile location center 15.

The invention claimed is:

1. A method of determining the location of a mobile terminal in a given area, comprising the steps of:
    including said mobile terminal both in a satellite-based positioning system and in a cellular communication system, whereby said mobile terminal is adapted to receive satellite signals from said satellite-based system and to be covered by at least one cell of said cellular communication system;
    determining a first set of values for positioning coordinates of said mobile terminal on the basis of information related to said cellular communication system, said first set of values comprising:
        approximate bi-dimensional positioning coordinates of said mobile terminal; and
        an estimate of an altitude coordinate of said mobile terminal;
    determining a search area for positioning coordinates of said mobile terminal based on said satellite signals and said estimate of said altitude coordinate;
    providing a geographical data base comprising data base items associated with a given set of bi-dimensional positioning coordinates of said mobile terminal in said search area corresponding to values for said altitude coordinate;
    identifying a new set of values for said positioning coordinates, wherein identifying the new set of values comprises:
        effecting, based on said information related to said cellular communication system, bi-dimensional positioning coordinates of said mobile terminal within said search area;
        accessing said geographical data base; and
        associating to the bi-dimensional positioning coordinates of said mobile terminal a corresponding value for said altitude coordinate;
    determining the distance between the first set of values and the new set of values as available before and after the current iteration step;
    comparing said distance with a threshold indicative of the degree of accuracy pursued in the location action; and
    if said distance is higher than said threshold, running a further iteration step wherein said search area is further re-defined on the basis of said satellite signals from said satellite-based system and the latest value available for said altitude coordinate and said steps of effecting bi-dimensional positioning coordinates, accessing said geographical data base, and associating to the bi-dimensional positioning coordinates of said mobile terminal a corresponding value for said altitude coordinate are further repeated, wherein said step of effecting bi-dimensional positioning coordinates is effected over said further re-defined area.

2. The method of claim 1, comprising the steps of:
    identifying, in said cellular communication system, at least one base station proximate to said mobile terminal, said proximate base station having an associated altitude coordinate; and
    using the altitude coordinate of said proximate base station as said estimate of said altitude coordinate.

3. The method of claim 1, comprising the steps of:
    identifying, in said cellular communication system, a plurality of base stations adjacent to said mobile terminal, each said adjacent base station having a respective altitude coordinate;
    determining the minimum of said altitude coordinates for said adjacent base stations; and using said minimum value as said estimate of said altitude coordinate.

4. The method of claim 1, comprising the steps of:
identifying, in said cellular communication system, a plurality of base stations adjacent to said mobile terminal, each said adjacent base station having a respective altitude coordinate;
determining an average value for said respective altitude coordinates over said adjacent base stations; and
using said average value as said estimate of said altitude coordinate.

5. The method of claim 4, comprising the steps of:
performing power measurements providing, for each said adjacent base station, a respective power value for said mobile terminal; and
determining said average value as a weighted average of said respective altitude coordinates values, the weighting being a function of said power values determined for each said adjacent base station.

6. The method of claim 1, comprising the steps of:
defining the search area for said positioning coordinates in the form of a hyperbolic set of points; and
determining said positioning coordinates within said hyperbolic set of points by using said information related to said cellular communication system.

7. The method of claim 1, wherein said iterative process comprises the steps of:
determining the distance between the sets of values of said location positioning coordinates as available before and after the current iteration step;
comparing said distance with a threshold indicative of the degree of accuracy pursued in the location action; and
if said distance is higher than said threshold, running a further iteration step wherein said search area is further re-defined on the basis of said satellite signals from said satellite-based system and the latest value available for said altitude coordinate and said steps of effecting said bi-dimensional positioning coordinates, accessing said geographical data base, and associating to the bi-dimensional positioning coordinates of said mobile terminal a corresponding value for said altitude coordinate are further repeated, wherein said step of effecting bi-dimensional positioning coordinates is effected over said further re-defined area.

8. The method of claim 1, wherein said positioning coordinates are determined based on satellite signals received from less than three satellites of said satellite-based system.

9. An apparatus comprising:
a first receiver adapted to receive satellite signals transmitted in a satellite-based system;
a second receiver adapted to receive signals transmitted in at least one cell of a cellular communication system;
a geographical data base comprising data base items associated with bi-dimensional positioning coordinates and altitude coordinates of mobile terminals;
at least one processing module configured for determining at least approximately the coordinates of a mobile terminal based on both satellite signals received from said satellite-based system and information related to said cellular communication system, wherein said coordinates include an altitude coordinate and said at least one processing module being configured for:
determining a first set of values for positioning coordinates of said mobile terminal on the basis of information related to said cellular communication system, said first set of values comprising:
approximate bi-dimensional positioning coordinates of said mobile terminal; and
an estimate of an altitude coordinate of said mobile terminal;
determining a search area for positioning coordinates of said mobile terminal based on said satellite signals and said estimate of said altitude coordinate;
identifying a new set of values for said positioning coordinates, wherein identifying the new set of values comprises:
effecting, based on said information related to said cellular communication system, bi-dimensional positioning coordinates of said mobile terminal within said search area;
accessing said geographical data base; and
associating to the bi-dimensional positioning coordinates of said mobile terminal a corresponding value for said altitude coordinate;
determining the distance between the first set of values and the new set of values as available before and after the current iteration step;
comparing said distance with a threshold indicative of the degree of accuracy pursued in the location action; and
if said distance is higher than said threshold, running a further iteration step wherein said search area is further re-defined on the basis of said satellite signals from said satellite-based system and the latest value available for said altitude coordinate and said steps of effecting bi-dimensional positioning coordinates, accessing said geographical data base, and associating to the bi-dimensional positioning coordinates of said mobile terminal a corresponding value for said altitude coordinate are further repeated, wherein said step of effecting bi-dimensional positioning coordinates is effected over said further re-defined area.

10. The arrangement of claim 9, wherein:
said cellular communication system comprises at least one base station proximate to said mobile terminal, said proximate base station having an associated altitude coordinate; and
said at least one module is configured for using the altitude coordinate of said proximate base station as said estimate of said altitude coordinate.

11. The apparatus of claim 9, wherein:
said cellular communication system comprises a plurality of base stations adjacent to said mobile terminal, each said adjacent base station having a respective altitude coordinate; and
said at least one module is configured for using as said estimate of said altitude coordinate one of the minimum of said altitude coordinates for said adjacent base stations and an average value for said respective altitude coordinates over said adjacent base stations.

12. The apparatus of claim 11, wherein said at least one module is configured for performing power measurements providing, for each said adjacent base station, a respective power value for said mobile terminal, and determining said average value as a weighted average of said respective altitude coordinates values, the weighting being a function of said power values determined for each said adjacent base station.

13. The apparatus of claim 9, comprising at least one module configured for:
defining the search area for said positioning coordinates in the form of a hyperbolic set of points; and determining said positioning coordinates within said hyperbolic set of points by using said information related to said cellular communication system.

14. The apparatus of claim 9, comprising at least one module configured for running said iterative process by:
determining the distance between the sets of values of said location positioning coordinates as available before and after the current iteration step; and
comparing said distance with a threshold indicative of the degree of accuracy pursued in the location action; and
if said distance is higher than said threshold, running a further iteration step wherein said search area is further re-defined on the basis of said satellite signals from said satellite-based system and the latest value available for said altitude coordinate and said steps of effecting said bi-dimensional positioning coordinates, accessing said geographical data base, and associating to the bi-dimensional positioning coordinates of said mobile terminal a corresponding value for said altitude coordinate are further repeated, wherein said step of effecting bi-dimensional positioning coordinates is effected over said further re-defined area.

15. A computer-readable computer-readable storage medium comprising instructions that when executed by a process perform steps comprising:
including said mobile terminal both in a satellite-based positioning system and in a cellular communication system, whereby said mobile terminal is adapted to receive satellite signals from said satellite-based system and to be covered by at least one cell of said cellular communication system;
determining a first set of values for positioning coordinates of said mobile terminal on the basis of information related to said cellular communication system, said first set of values comprising:
approximate bi-dimensional positioning coordinates of said mobile terminal; and
an estimate of an altitude coordinate of said mobile terminal;
determining a search area for positioning coordinates of said mobile terminal based on said satellite signals and said estimate of said altitude coordinate;
providing a geographical data base comprising data base items associated with a given set of bi-dimensional positioning coordinates of said mobile terminal in said search area corresponding to values for said altitude coordinate;
identifying a new set of values for said positioning coordinates, wherein identifying the new set of values comprises:
effecting, based on said information related to said cellular communication system, bi-dimensional positioning coordinates of said mobile terminal within said search area;
accessing said geographical data base; and
associating to the bi-dimensional positioning coordinates of said mobile terminal a corresponding value for said altitude coordinate;
determining the distance between the first set of values and the new set of values as available before and after the current iteration step;
comparing said distance with a threshold indicative of the degree of accuracy pursued in the location action; and
if said distance is higher than said threshold, running a further iteration step wherein said search area is further re-defined on the basis of said satellite signals from said satellite-based system and the latest value available for said altitude coordinate and said steps of effecting bi-dimensional positioning coordinates, accessing said geographical data base, and associating to the bi-dimensional positioning coordinates of said mobile terminal a corresponding value for said altitude coordinate are further repeated, wherein said step of effecting bi-dimensional positioning coordinates is effected over said further re-defined area.

16. The computer-readable computer-readable medium of claim 15, comprising the steps of:
identifying, in said cellular communication system, at least one base station proximate to said mobile terminal, said proximate base station having an associated altitude coordinate; and
using the altitude coordinate of said proximate base station as said estimate of said altitude coordinate.

17. The computer-readable computer-readable medium of claim 15, comprising the steps of:
identifying, in said cellular communication system, a plurality of base stations adjacent to said mobile terminal, each said adjacent base station having a respective altitude coordinate;
determining the minimum of said altitude coordinates for said adjacent base stations; and
using said minimum value as said estimate of said altitude coordinate.

18. The computer-readable computer-readable medium of claim 15, comprising the steps of:
identifying, in said cellular communication system, a plurality of base stations adjacent to said mobile terminal, each said adjacent base station having a respective altitude coordinate;
determining an average value for said respective altitude coordinates over said adjacent base stations; and
using said average value as said estimate of said altitude coordinate.

19. The computer-readable computer-readable medium of claim 18, comprising the steps of:
performing power measurements providing, for each said adjacent base station, a respective power value for said mobile terminal; and
determining said average value as a weighted average of said respective altitude coordinates values, the weighting being a function of said power values determined for each said adjacent base station.

20. The computer-readable computer-readable medium of claim 15, comprising the steps of:
defining the search area for said positioning coordinates in the form of a hyperbolic set of points; and
determining said positioning coordinates within said hyperbolic set of points by using said information related to said cellular communication system.

21. The computer-readable computer-readable medium of claim 15, wherein said iterative process comprises the steps of:
determining the distance between the sets of values of said location positioning coordinates as available before and after the current iteration step; and
comparing said distance with a threshold indicative of the degree of accuracy pursued in the location action; and
if said distance is higher than said threshold, running a further iteration step wherein said search area is further re-defined on the basis of said satellite signals from said satellite-based system and the latest value available for said altitude coordinate and said steps of effecting said bi-dimensional positioning coordinates, accessing said geographical data base, and associating to the bi-dimensional positioning coordinates of said mobile terminal a corresponding value for said altitude coordinate are further repeated, wherein said step of effecting bi-dimensional positioning coordinates is effected over said further re-defined area.

22. The computer-readable computer-readable medium of claim 15, wherein said positioning coordinates are determined based on satellite signals received from less than three satellites of said satellite-based system.

* * * * *

UNITED STATES PATENT AND TRADEMARK OFFICE
CERTIFICATE OF CORRECTION

PATENT NO. : 8,629,802 B2  
APPLICATION NO. : 13/022083  
DATED : January 14, 2014  
INVENTOR(S) : Boiero et al.

Page 1 of 2

It is certified that error appears in the above-identified patent and that said Letters Patent is hereby corrected as shown below:

In the Claims

Claim 7, Column 11, Line 30, before "positioning coordinates", delete "location".

Claim 14, Column 13, Line 7, before "positioning coordinates", delete "location".

Claim 15, Column 13, Line 23, "A computer-readable computer-readable storage" should read --A non-transitory computer-readable storage--.

Claim 16, Column 14, Line 9, "The computer-readable computer-readable medium" should read --The non-transitory computer-readable medium--.

Claim 17, Column 14, Line 17, "The computer-readable computer-readable medium" should read --The non-transitory computer-readable medium--.

Claim 18, Column 14, Line 27, "The computer-readable computer-readable medium" should read --The non-transitory computer-readable medium--.

Claim 19, Column 14, Line 37, "The computer-readable computer-readable medium" should read --The non-transitory computer-readable medium--.

Claim 20, Column 14, Line 46, "The computer-readable computer-readable medium" should read --The non-transitory computer-readable medium--.

Claim 21, Column 14, Line 53, "The computer-readable computer-readable medium" should read --The non-transitory computer-readable medium--.

Claim 21, Column 14, Line 57, before "positioning coordinates", delete "location".

Signed and Sealed this  
Eighth Day of May, 2018

Andrei Iancu  
*Director of the United States Patent and Trademark Office*

CERTIFICATE OF CORRECTION (continued)
U.S. Pat. No. 8,629,802 B2

Claim 22, Column 15, Line 6, "The computer-readable computer-readable medium" should read
--The non-transitory computer-readable medium--.